United States Patent [19]

Kato

[11] Patent Number: 5,109,723

[45] Date of Patent: May 5, 1992

[54] ROTATION TRANSMISSION MECHANISM

[75] Inventor: Masao Kato, Kumagaya, Japan

[73] Assignee: Kabushiki Kaisha Toshiba, Kawasaki, Japan

[21] Appl. No.: 470,345

[22] Filed: Jan. 25, 1990

[30] Foreign Application Priority Data

Jan. 31, 1989 [JP] Japan .................. 1-21001

[51] Int. Cl.$^5$ .................. F16H 57/00; F16H 37/06
[52] U.S. Cl. .................. 74/411; 74/440; 74/352; 360/85; 360/96.5
[58] Field of Search .................. 74/411, 443, 354, 8, 74/440; 360/85, 96.5

[56] References Cited

U.S. PATENT DOCUMENTS

| 403,101 | 5/1889 | Graf .................. 74/443 |
|---|---|---|
| 1,163,925 | 12/1915 | Hudson .................. 74/443 |
| 1,804,906 | 5/1931 | Wemp .................. 74/443 |
| 3,447,392 | 6/1989 | Kawchitch .................. 74/411 |
| 4,468,207 | 8/1984 | Yoshida .................. 74/411 X |
| 4,499,783 | 2/1985 | Takemasa .................. 74/411 |
| 4,660,432 | 4/1987 | Damas .................. 74/440 |
| 4,700,582 | 10/1987 | Bessette .................. 74/411 X |
| 4,739,670 | 4/1988 | Tomita et al. .................. 74/440 X |
| 4,825,312 | 4/1989 | Yoshikawa et al. .................. 360/96.5 |
| 4,853,804 | 8/1989 | Suwa et al. .................. 360/96.5 X |
| 4,935,895 | 6/1990 | Ohyama .................. 360/96.5 |
| 4,951,164 | 8/1990 | Yasaka et al. .................. 360/96.5 X |

FOREIGN PATENT DOCUMENTS 687715 2/1953 United Kingdom .................. 74/443

Primary Examiner—Leslie A. Braun
Assistant Examiner—Matthew W. Stavish
Attorney, Agent, or Firm—Cushman, Darby & Cushman

[57] ABSTRACT

A second clutch gear, which serves as a driving gear, receives a driving force from a capstan motor. A first clutch gear, which serves as a driven gear, is arranged coaxial with the second clutch gear, with a friction mechanism interposed therebetween. The first clutch gear receives the driving force which the second clutch gear transmits thereto through the friction mechanism. A directly-coupling gear for directly transmitting the driving force from the second clutch gear to the first clutch gear is provided such that it can be brought into mesh with the first and second clutch gears. The directly-coupling gear includes first and second gears which are arranged coaxial with each other and are designed to provide gaps in the circumferential direction thereof, such the gaps can absorb torsion generated between the first and second clutch gears. Engagement-switching means moves the directly-coupling gear between a first position at which the directly-coupling gear is engaged with the first and second clutch gears and a second position at which the directly-coupling gear is disengaged from the first and second clutch gears.

5 Claims, 12 Drawing Sheets

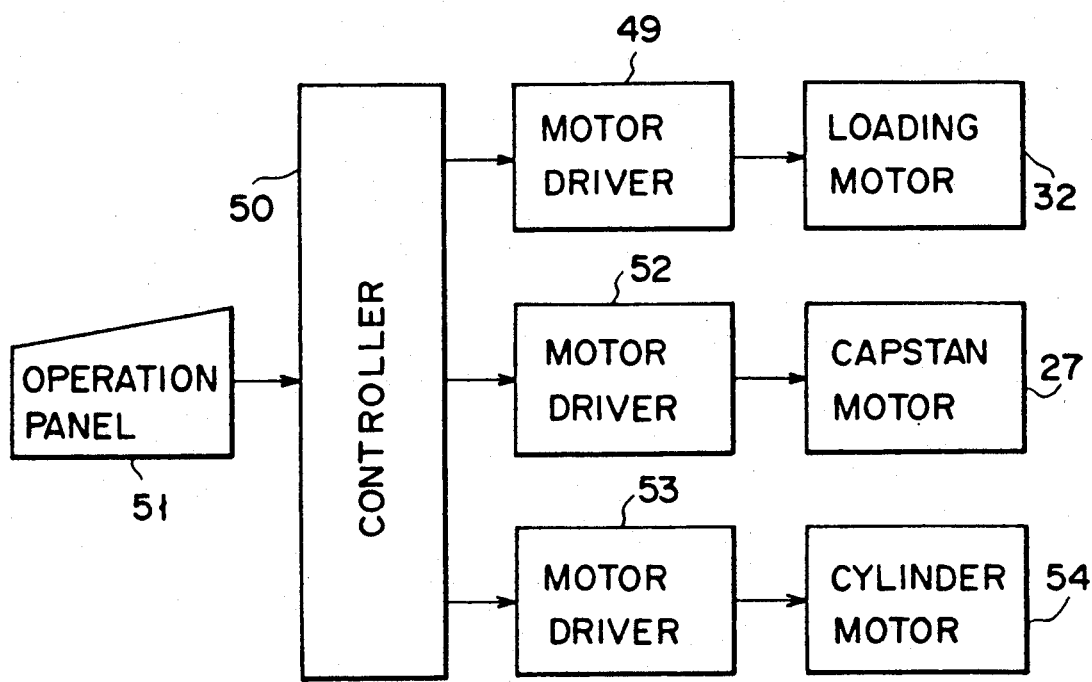
F I G. 8

ROTATION TRANSMISSION MECHANISM

BACKGROUND OF THE INVENTION

1. Field of the Invention

The present invention relates to a rotation transmission mechanism employed in the reel base-driving device of a magnetic recording/reproducing apparatus, such as a video tape recorder (VTR).

2. Description of the Related Art

As is well known, a helical scan VTR is provided with both a front loading mechanism and a tape-loading mechanism. When a video tape cassette containing a video tape is horizontally inserted into the cassette insertion port formed in the front face of the VTR, the front loading mechanism receives the cassette by means of a cassette holder and draws the cassette inside together with the cassette holder, and then lowers the cassette until it comes to the predetermined cassette-loading position. When the cassette is being lowered, its cover is opened, and the tape-pulling members of the tape-loading mechanism are inserted into the cassette and brought into contact with the inner side of the tape. Next, the tape-loading mechanism causes the tape-pulling members to pull the tape out of the cassette placed at the cassette-loading position and guides the tape such that it is in contact with about half of the circumference of the rotating cylinder. After the tape-loading mechanism sets the tape along the tape feed path way, various operation modes, such as recording play, freeze (i.e., still image reproduction), slow play, fast-forward play, fast-rewind play, fast forward, and fast rewind, are selectively established with a mode-establishing mechanism and its associated circuits. If an eject key is operated, the tape-loading mechanism draws the tape back into the cassette, and the front loading mechanism returns the cassette from the cassette-loading position to the cassette insertion port.

In this type of magnetic recording/reproducing apparatus, the reel bases having reel shafts adapted for engagement with the reel shaft-engaging holes of a tape cassette is rotated by a reel base-driving device, so as to drive a tape. The reel base-driving device includes a rotation transmission mechanism which transmits the rotation of a capstan motor to the reel bases. With the reel bases driven or controlled by use of torque desirable for an operating mode, the tape is driven in a stable manner in accordance with the operating mode.

In the rotation transmission mechanism of a conventional reel base-driving device, a pulley constituting a belt transmission is arranged at an intermediate point between the reel bases such that the pulley is swingable around a shaft. A driving gear and a driven gear are coaxially mounted on the pulley, with a friction mechanism interposed. This friction mechanism includes a clutch plate, and two friction couplings located on the respective sides of the clutch plate and having frictional forces different from each other. One of the friction couplings is in contact with the driving gear, while the other one is in contact with the driven gear. The clutch plate is coupled to one end of a coupling member rotatably supported by the driven gear. The other end of the coupling member is coupled to the driven gear by use of a coil spring. The coupling member and the coil spring jointly constitute a one-way clutch. With this construction, when the driving gear is rotated, this rotation is first converted, in accordance with the rotating direction, into one of first and second torques which correspond to the frictional forces of the friction couplings of the friction mechanism, and is then transmitted to the driven gear.

In the conventional reel base-driving device, a reel base-driving gear for driving or controlling the reel bases is in mesh with the driven gear of the rotation transmission mechanism by use of a swingable member. The reel base-driving gear is rotated and urged by the swingable member in accordance with the rotating direction and engages with one of the take-up and supply reel bases, to thereby rotate the reel base which it engages with. Thus, the reel base is driven with the first torque in the play and fast-forward play modes of the magnetic recording/reproducing apparatus, and is driven with the second torque in the rewind play and fast-rewind play modes of the apparatus.

In the rotation transmission mechanism, a directly-coupling gear is arranged in opposition to the driving and driven gears such that it can be engaged with the driving and driven gears or disengaged therefrom. This directly-coupling gear is designed to transmit the rotating force of the driving gear directly to the driven gear, to thereby providing the reel base-driving gear with third torque used for quickly driving the tape in the fast-forward and fast-rewind modes of the magnetic recording/reproducing apparatus.

However, this type of rotation transmission mechanism is faced with the following problems. As is shown in FIG. 1A, driving gear 1 and driven gear 2 are driven while being urged in directions opposite to each other (i.e., the directions indicated by arrows A and B). As a result, the teeth of directly-coupling gear 3 which is in mesh with the driving and driven gears are twisted, as is shown in FIG. 1B, resulting in noise during gear engagement. In addition, since the torsion between driving and driven gears 1 and 2 acts in such a manner as to urge directly-coupling gear 3 in a direction away from driving and driven gears 1 and 2, as indicated by arrow C in FIG. 1A, a very large force is required for bringing directly-coupling gear 3 into engagement with driving and driven gears 1 and 2.

As mentioned above, the conventional rotation transmission mechanism has problems, in that the torsion acting between the driving and driven gears causes the teeth of the directly-coupling gear to be twisted, resulting in noise during gear engagement, and in that a very large force is required to control the engagement of the directly-coupling gear since the torsion between the driving and driven gear acts in such a manner as to urge the directly-coupling gear in a direction away from the driving and driven gear.

SUMMARY OF THE INVENTION

Accordingly, an object of the present invention is to provide a rotation transmission mechanism which is simple in construction, reliably prevents noise during gear engagement, and can be driven or controlled with a small force.

To achieve this object, the present invention provides a rotation transmission mechanism comprising:

a first driving gear to which a driving force is transmitted from a driving source;

a second driving gear, arranged coaxial with the first driving gear with a friction mechanism interposed, for receiving the driving force transmitted from the first driving gear through the friction mechanism and for outputting the driving force;

first and second directly-coupling gears engageable with the first and second driving gears and arranged coaxial with each other in such a manner as to provide gaps of a predetermined size in a circumferential direction thereof, the gaps serving to absorb torsion generated between the first and second driving gears, the first and second directly-coupling gears transmitting the driving force from the first driving gear directly to the second driving gear when the first and second directly-coupling gears are engaged with the first and second driving gears; and engagement-switching means for selectively moving the first and second directly-coupling gears between a first position at which the first and second directly-coupling gears are engaged with the first and second driving gears and a second position at which the first and second directly-coupling gears are disengaged from the first and second driving gears.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 8 is a block circuit diagram of the electric circuit of a VTR;

DETAILED DESCRIPTION OF THE PREFERRED EMBODIMENTS

One embodiment of the present invention will now be described, with reference to the accompanying drawings.

Figure 1A:
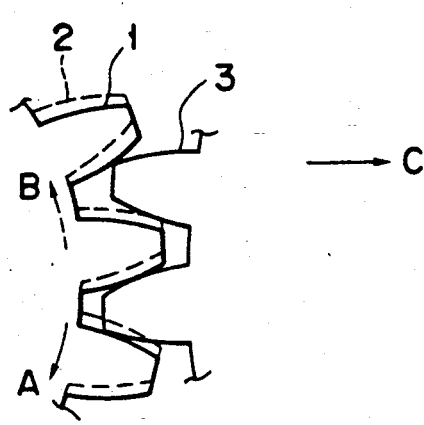
FIGS. 1A and 1B are illustrations both for explaining problems occurring in a conventional rotation transmission mechanism, FIG. 1A being a plan view of the driving gear, driven gear, and directly-coupling gear of the conventional mechanism, and FIG. 1B being a perspective view of a tooth of the directly-coupling gear.
Figure 1B:
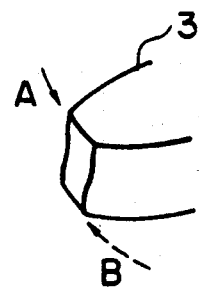
Figure 2A:
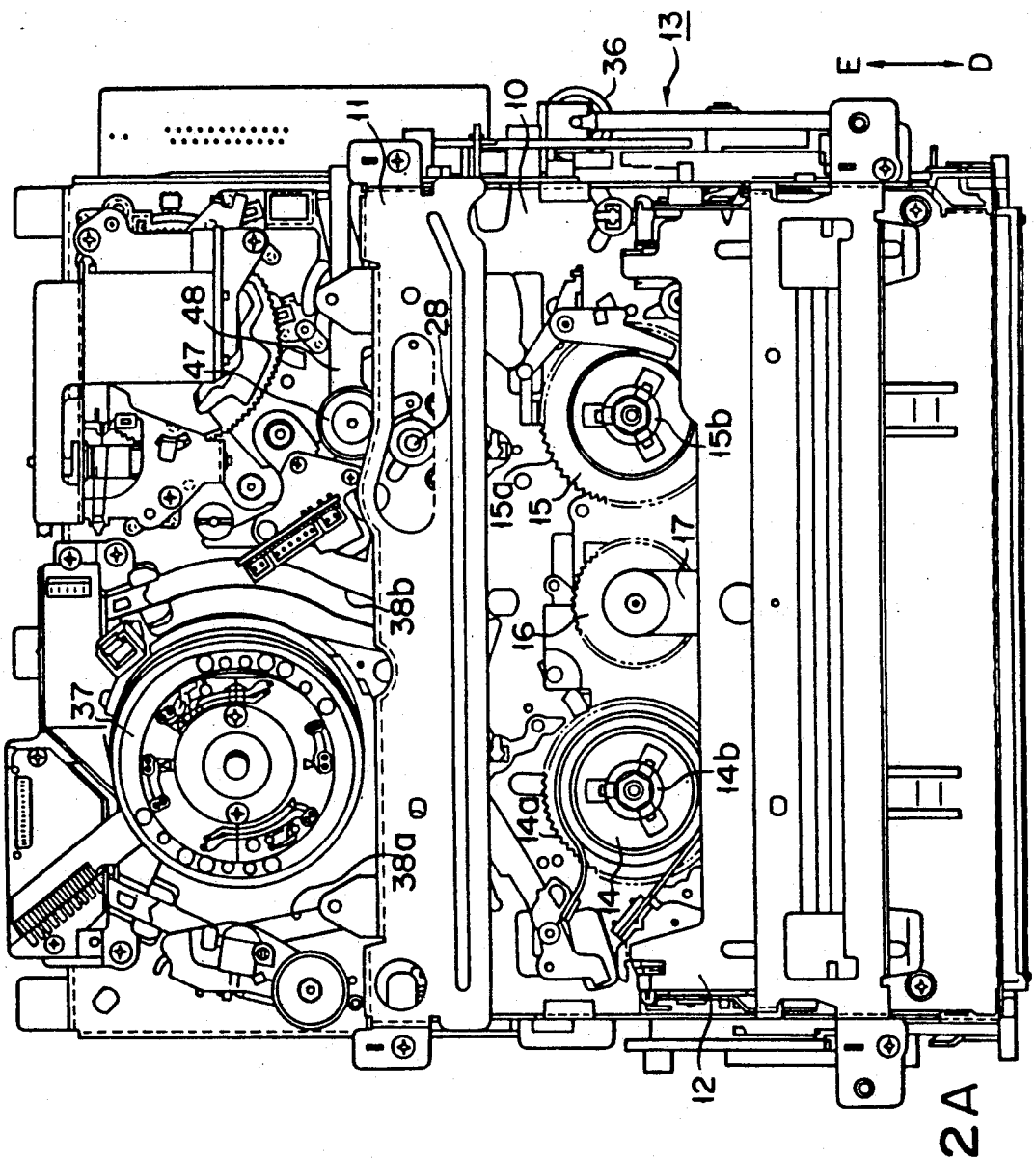
FIGS. 2A–2C are top, side and bottom views, respectively, of a magnetic recording/reproducing apparatus employing a reel base-driving device to which a rotation transmission mechanism according to one embodiment of the present invention is applied.
Figure 2B:
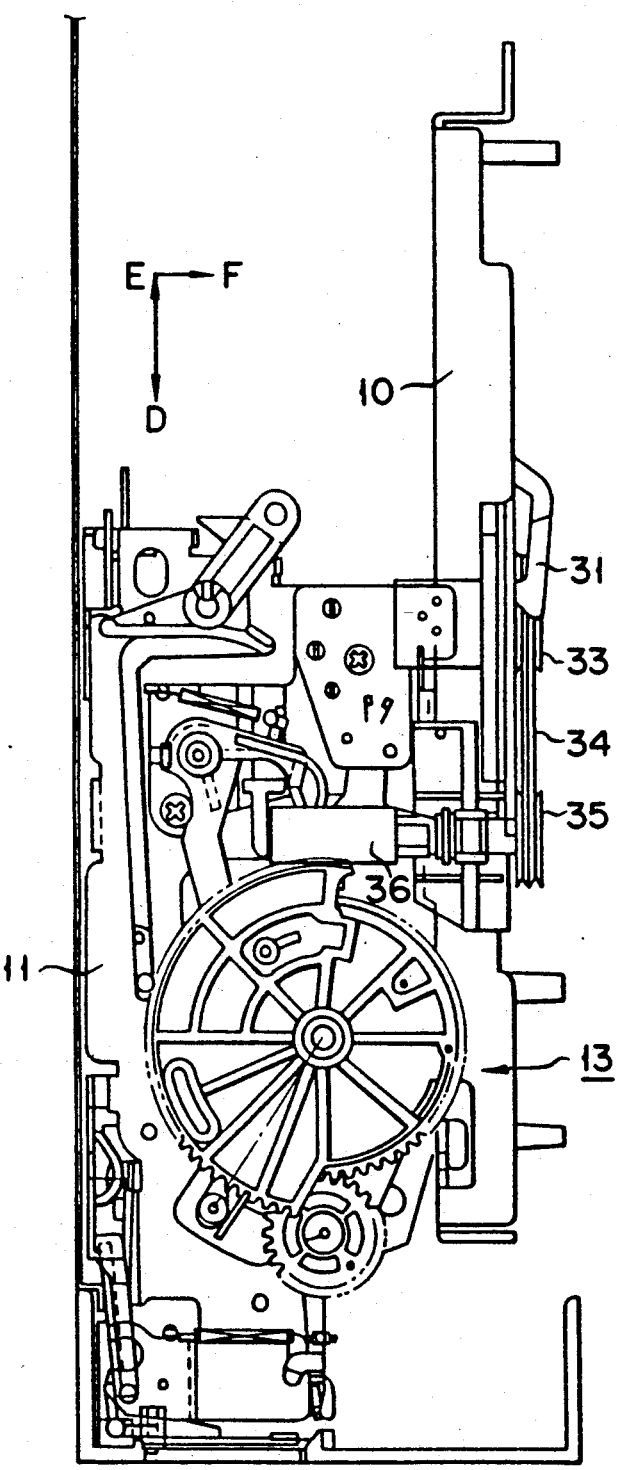
Figure 2C:
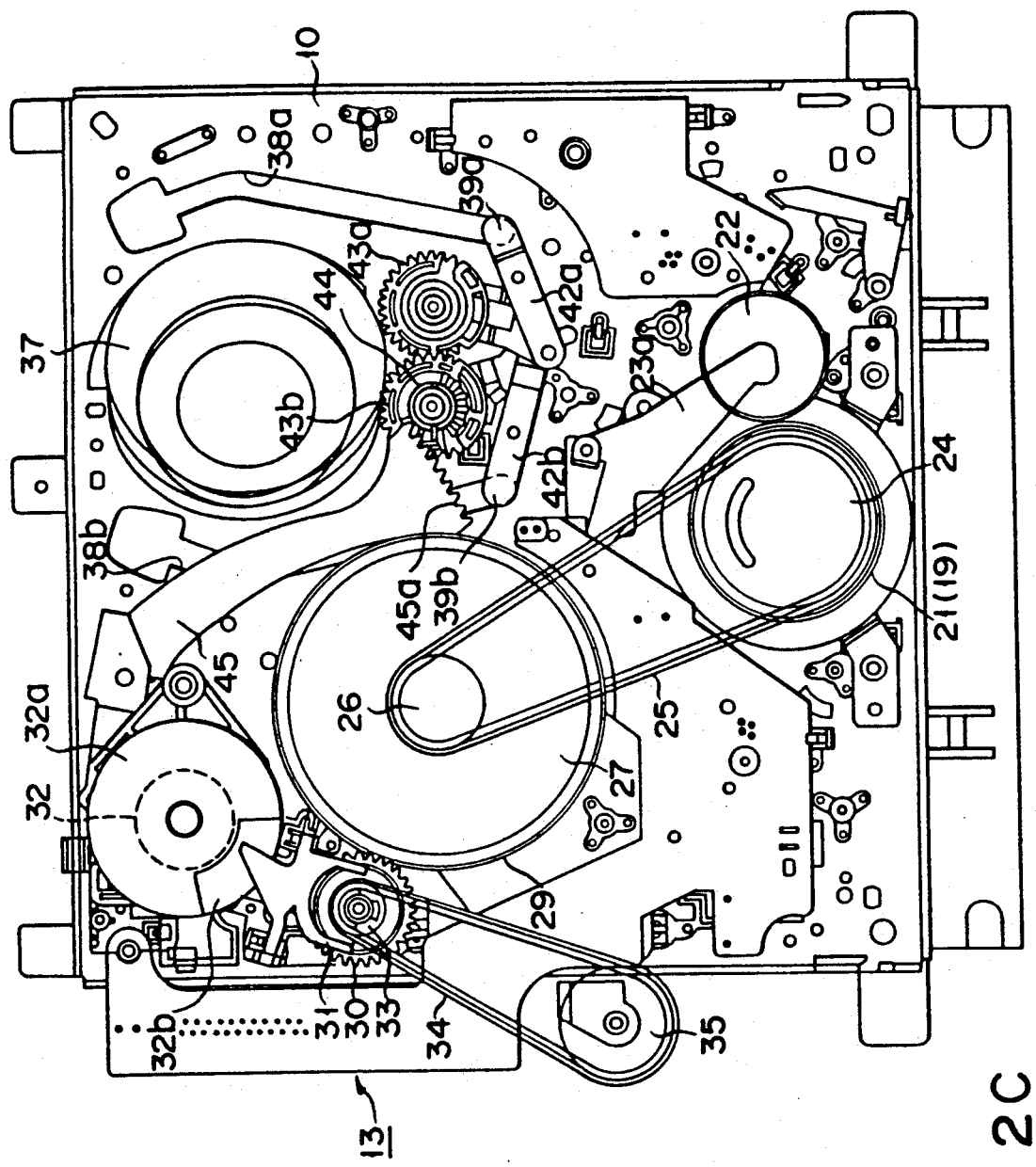
Figure 3:
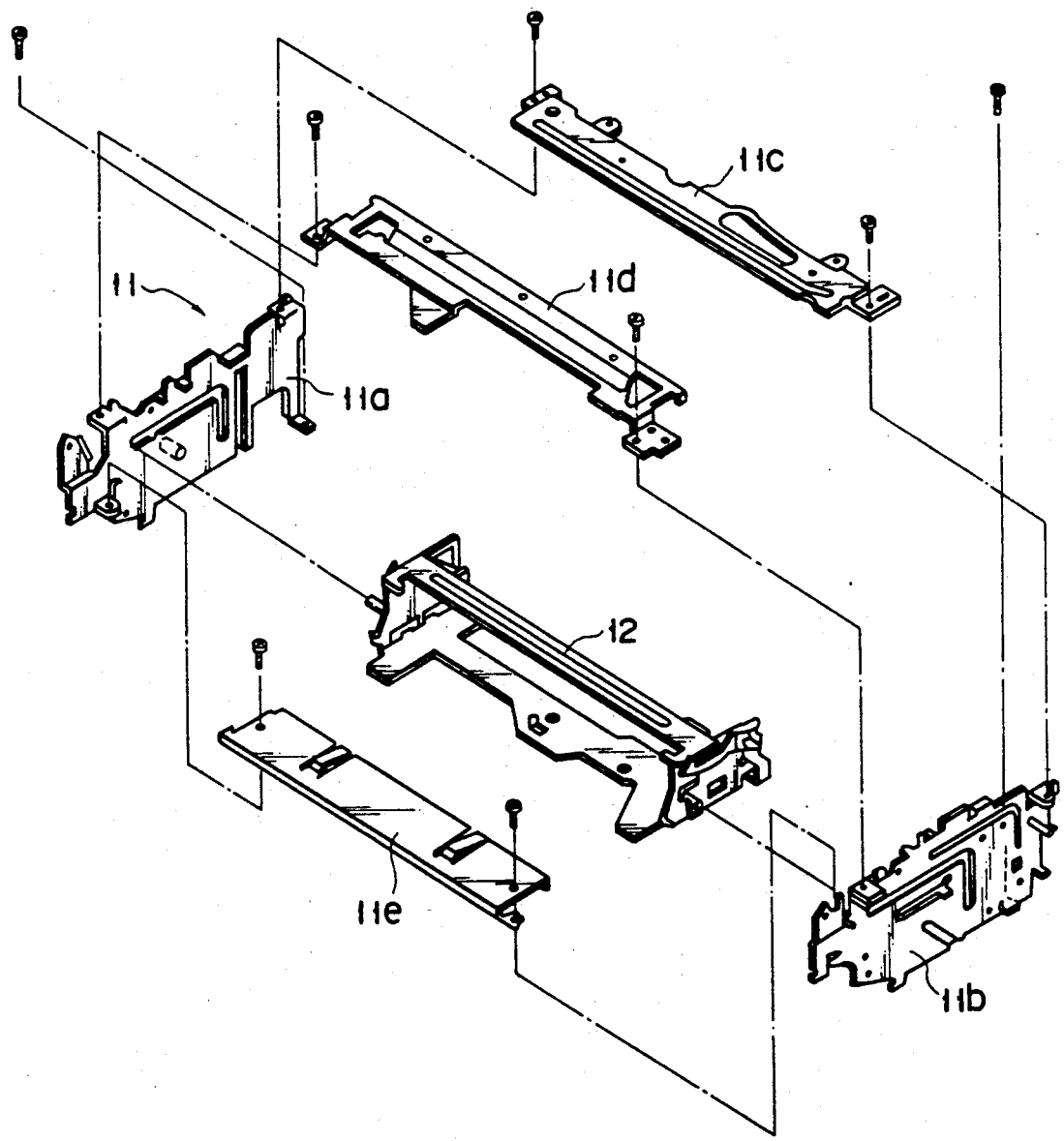
FIG. 3 is a perspective view illustrating how a support member is assembled.

FIGS. 2A, 2B and 2C are top, side and bottom views, respectively, of a VTR to which a rotation transmission mechanism of the invention is applied. Referring to the Figures, frame member 11 is coupled to one end of main chassis 10. Frame member 11 is made up of left plate 11a, right plate 11b, first upper connecting plate 11c, second upper connecting plate 11d, and lower connecting plate 11e, as is shown in FIG. 3. Cassette holder 12 is supported by frame member 11 such that it is movable in the directions indicated by arrows D, E, and F (the direction indicated by arrow F is perpendicular to the directions indicated by arrows D and E). Cassette holder 12 is adapted to receive a cassette (which is not shown in FIGS. 2A, 2B and 2C, for simplicity) when it is located at the cassette insertion port. In response to the insertion of the cassette into cassette holder 12, front loading mechanism 13 is automatically driven. This front loading mechanism moves cassette holder 12 in direction E, together with the cassette inserted therein, until cassette holder 12 reaches a predetermined position. Then, front loading mechanism 13 moves cassette holder 12 in direction F. As a result, the cassette is fitted on supply and take-up reel bases 14 and 15, which are parts of the reel base-driving device of a tape-driving mechanism.

Gears 14a and 15a are coupled to reel bases 14 and 15, respectively. Reel 16 base-driving gear 16 constituting gears 14a and 15a. This reel base-driving gear 16 is supported by one end of swing member 17.

Figure 4:
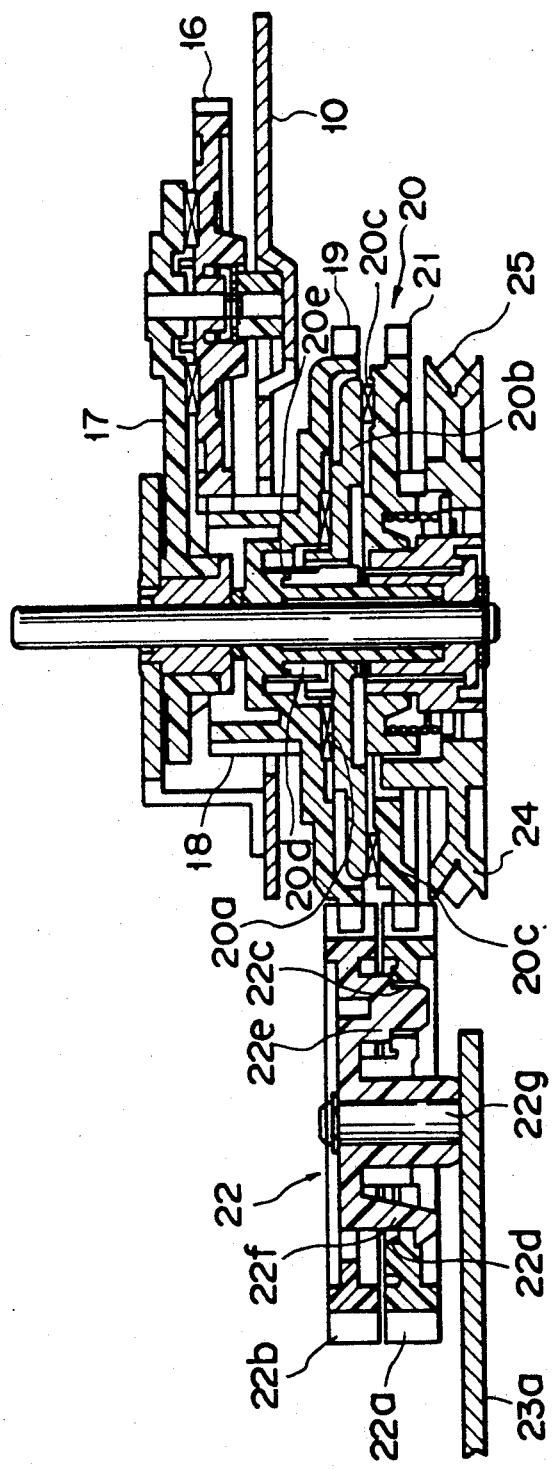
FIG. 4 is a sectional view of the reel base-driving device to which the rotation transmission mechanism of the embodiment is applied.

As is shown in FIG. 4, gear 18, which is in mesh with reel base-driving gear 16, is attached to the other end of swing member 17.

A rotation transmission mechanism is connected to gear 18. Specifically, first clutch gear 19 serving as a driven gear is arranged coaxial with gear 18. Second clutch gear 21 serving as a driving gear is stacked upon first clutch gear 19, with friction mechanism 20 interposed therebetween. Directly-coupling gear 22 is arranged in such a manner as to face both clutch gears 19 and 21. Directly-coupling gear 22 can be brought into contact with the first and second clutch gears 19 and 21, and can be moved away from them. Directly-coupling gear 22 is swung by change-over lever 23a (which interlocks with an operation mode-switching mechanism), such that it is selectively brought into mesh with both clutch gears 19 and 21. Pulley 24 is arranged coaxial with second clutch gear 21, and driving belt 25 is wound around pulley 24.

As is shown in FIG. 2C, driving belt 25 is wound around driving pulley 26. This driving pulley 26 is fitted on the rotating shaft of capstan motor 27. Therefore, the driving force of capstan motor 27 is transmitted first to pulley 24 via driving belt 25, and then to second clutch gear 21. Capstan shaft 28 is arranged coaxial with capstan motor 27.

Figure 5:
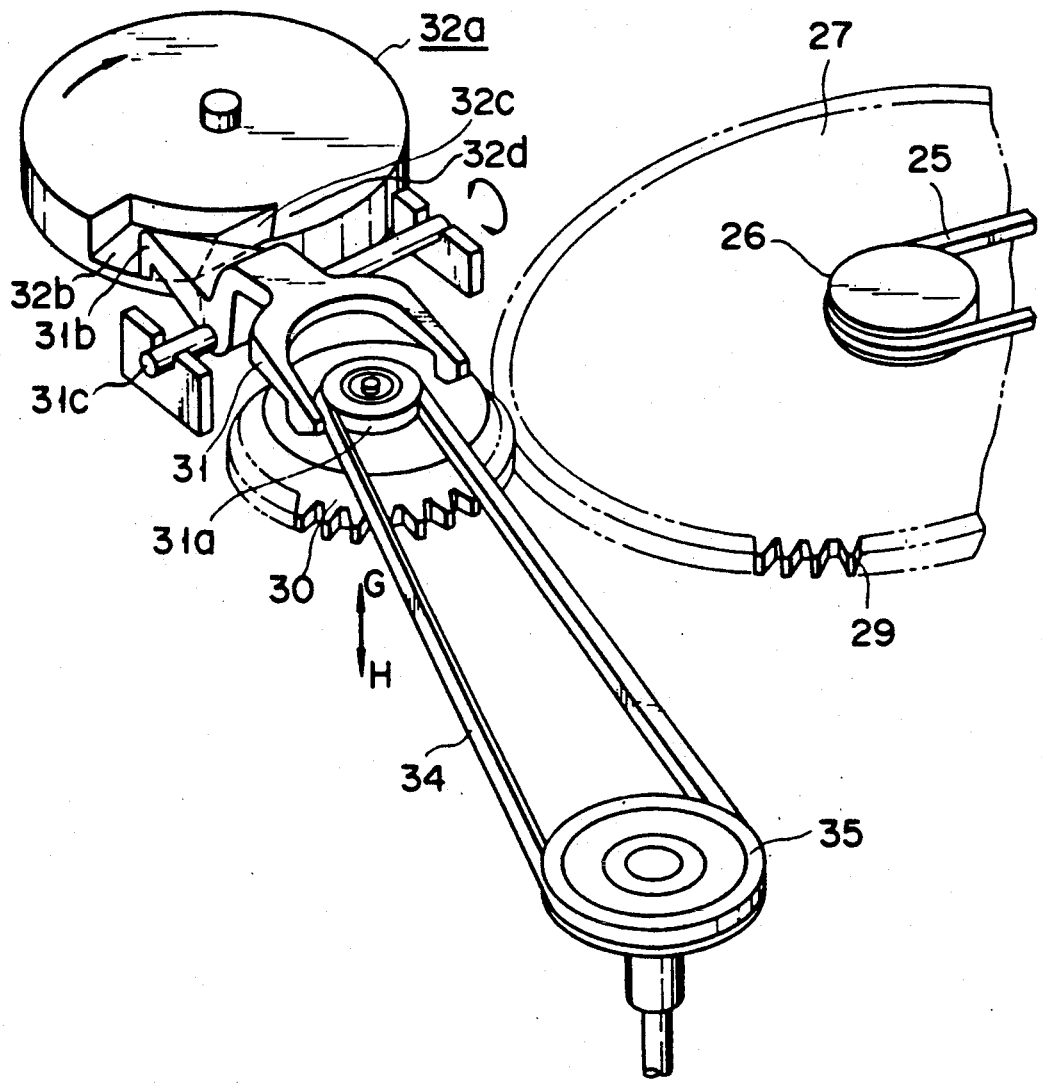
FIG. 5 is a perspective view of a loading-switching mechanism.

A clutch mechanism is provided for capstan motor 27 as mentioned above. The clutch mechanism serves to selectively transmit the rotation of capstan motor 27 to front loading mechanism 13. More specifically, driving gear 29 is fitted around the periphery of the rotating member of capstan motor 27, as is shown in FIG. 5. Vertically-movable gear 30 is arranged such that it faces driving gear 29. As will be detailed later, vertically-movable gear 30 is designed to transmit its torque to front loading mechanism 13. First end 31a of vertically-swingable switch lever 31 is in contact with the upper side of vertically-movable gear 30. Second end 31b of the switch lever 31 engageable with one side of first mode-switching cam 32a, which is one of the mode-switching cams arranged coaxial with the operation mode-switching mechanism.

First mode-switching cam 32a has step portion 32b which is in the form of a circular arc having predetermined size. Slanted portion 32c is formed in that end of step portion 32b which is located downstream with reference to the rotating direction of first mode-switching cam 32a. Slanted portion 32c is formed in such a manner that step portion 32b is smoothly connected to surface 32d of first mode-switching cam 32a.

With this construction, second end 31b of switch lever 31 engages with one of step portion 32b, slanted portion 32c and surface 32d of first mode-switching cam 32a in accordance with the rotation of this cam 32a. As a result of this engagement, first end 31a of switch lever 31 swings in the axial direction of vertically-movable gear 30, with rotatable shaft 31c as a center of swing.

Figure 6A:
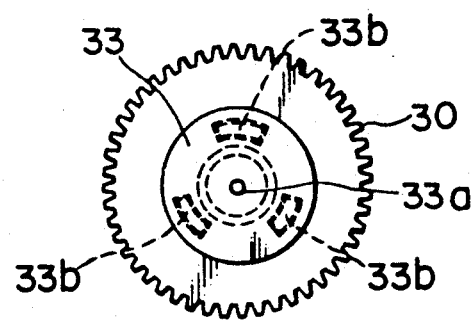
FIGS. 6A and 6B are top and bottom views, respectively, illustrating both a pulley and a vertically-movable gear.
Figure 6B:
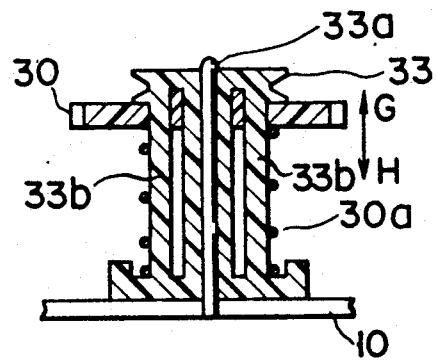

As is shown in FIGS. 6A and 6B, vertically-movable gear 30 is coaxial with pulley 33, and this pulley 33 is coupled to main chassis 10 such that it is rotatable around shaft 33a. Vertically-movable gear 30 is located around pulley 33 and is urged toward pulley 33 in the axial direction of shaft 33a by spring 30a. The rotation of vertically-movable gear 30 is transmitted to pulley 33 through stop members 33b. That is, vertically-movable gear 30 and pulley 33 are rotatable in the same direction.

Driving belt 34 is wound around both pulley 33 and pulley 35. As is shown in FIG. 2C, pulley 35 is coaxial with worm 36 of front loading mechanism 13.

At the time of loading a tape cassette, second end 31b of switch lever 31 engages with step portion 32b, due to the rotation of first mode-switching cam 32a. Therefore, first end 31a of switch lever 31 is separated from vertically-movable gear 30. As a result, vertically-movable gear 30 is raised (in the direction E) by the urging force of spring 30a and brought into mesh with driving gear 29. Thus, the rotation of capstan motor 27 is transmitted to front driving mechanism 13 through vertically-movable gear 30, pulley 33, driving belt 34, pulley 35 and worm 36, whereby front driving mechanism 13 performs the loading of cassette holder 12.

When the loading of the cassette is completed, first mode-switching cam 32a is rotated, and second end 31b of switch lever 31 engages with surface 32d after sliding along slanted portion 32c. Therefore, first end 31a of switch lever 31 contacts vertically-movable gear 30 and pushes this gear downward. As a result, vertically-movable gear 30 is moved downward in direction H in spite of the urging force of spring 30a. Thus, the rotation of pulley 33 is stopped, and the loading of cassette holder 12 is stopped, accordingly.

Loading motor 32 is designed to drive not only first mode-switching cam 32a mentioned above but also the other mode-switching cams.

As is shown in FIG. 2A, helical scan type cylinder 37 having magnetic heads (not shown) is rotatably coupled to main chassis 10 mentioned above. Around this cylinder 37, first and second guide holes 38a and 38b (which are parts of a tape-loading mechanism) are provided such that the two guide holes correspond in location to the tape inlet and outlet sides, respectively.

Figure 7A:
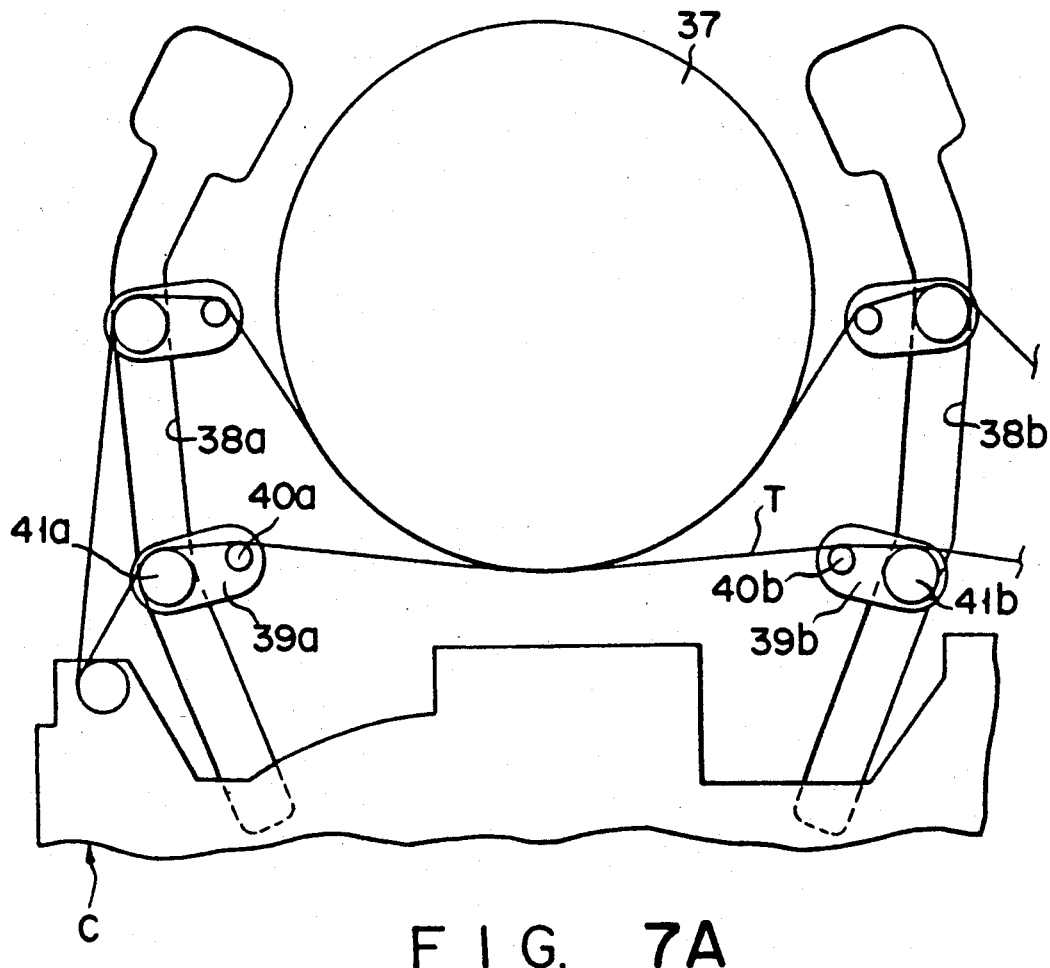
FIGS. 7A and 7B are top and bottom views, respectively, illustrating a tape-loading mechanism.

As is shown in FIG. 7A, first and second tape-pulling members 39a and 39b are fitted in first and second guide holes 38a and 38b, respectively, such that they are movable within the guide holes. Slanted post 40a substantially parallel to cylinder 37 and guide roller 41a substantially perpendicular to main chassis 10 are provided for first tape-pulling member 39a such that they are located side by side with reference to each other. Likewise, slanted post 40b substantially parallel to cylinder 37 and guide roller 41b substantially perpendicular to main chassis 10 are provided for second tape-pulling member 39b such that they are located side by side with reference to each other.

Figure 7B:
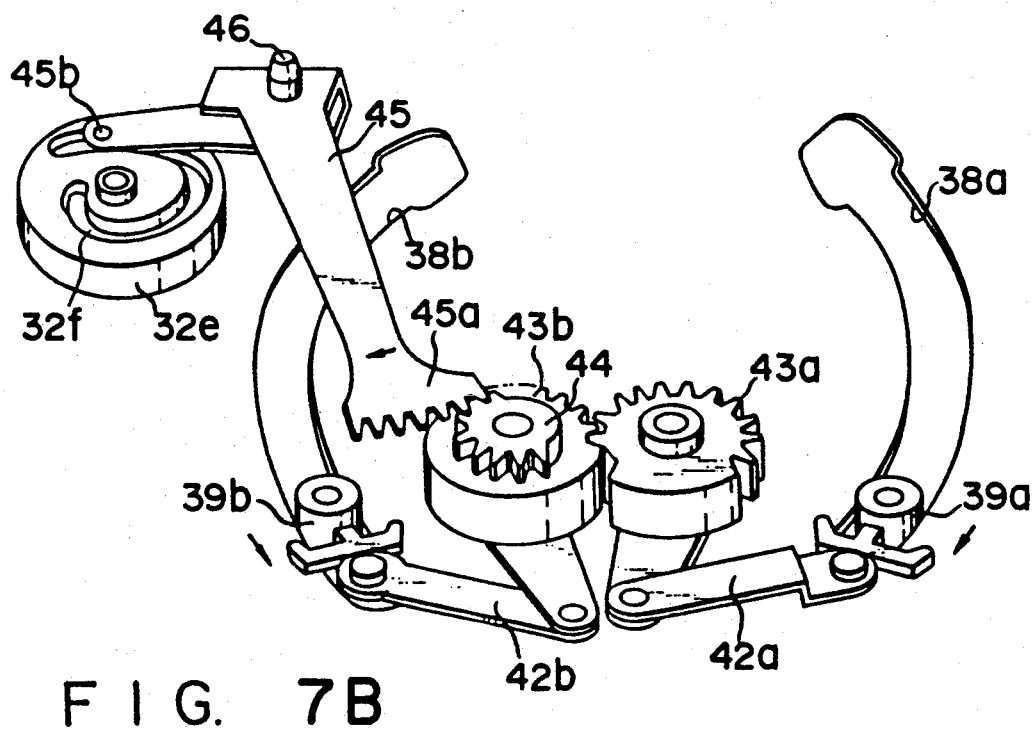

As is shown in FIG. 7B, the one-end portions of first and second links 42a and 42b are coupled to the proximal ends of first and second tape-pulling members 39a and 39b, respectively. The other-end portions of first and second links 42a and 42b are supported by first and second driving gears 43a and 43b, respectively, which are in mesh with each other. Half-gear 44 is arranged coaxial with second driving gear 43b. Sectorial gear 45a formed at one end of driving lever 45 is in mesh with half-gear 44. An intermediate point of driving lever 45 is swingably supported by main chassis 10 by means of shaft 46. Pin 45b located at the other end of driving lever 45 engages with cam groove 32f formed in second mode-switching cam 32e, and this cam 32e is rotated within a predetermined angular range by loading motor 32. Therefore, driving lever 45 is driven by the movement of second mode-switching cam 32e, and transmits the driving force to first and second tape-pulling members 39a and 39b, through half-gear 44, first and second driving gears 43a and 43b, and first and second links 42a and 42b, whereby performing tape loading.

As is shown in FIG. 2A, pinch roller 47, which is part of the tape-driving mechanism, is arranged on main chassis 10 such that it is located in the neighborhood of capstan shaft 28 mentioned above. Pinch roller 47 is swingably supported by one end of pinch lever 48. Pinch lever 48 is swung in association with the above-mentioned mode-switching cams by a linking mechanism (not shown). As a result of the swing of pinch lever 48, pinch roller 47 supported at one end of lever 48 is pressed against capstan shaft 28, with tape T interposed.

First and second mode-switching cams 32a and 32e mentioned above are coaxial with the other mode-switching cams (not shown). All these mode-switching cams are rotated within the same angular range by loading motor 32, and their angles of rotation are determined in accordance with the operation modes of the VTR. As is shown in FIG. 8, loading motor 32 is driven by motor driver 49 under the control of controller 50. In accordance with the user's operation of control panel 51, controller 50 determines an operation mode of the VTR. Controller 50 causes the mode-switching cams to be rotated by the angle corresponding to the determined operation mode. Further, controller 50 controls motor driver 52 in accordance with the determined operation mode, to thereby drive capstan motor 27. The torque of capstan motor 27 is selectively transmitted to capstan shaft 28, reel base 14 located on the tape supply side, reel base 15 located on the tape take-up side, etc. Still further, controller 50 controls motor driver 53 in accordance with the determined operation mode, to thereby drive cylinder motor 54 to rotate cylinder 37.

In the VTR having the above-mentioned construction, loading motor 32 is driven and first mode-switching cam 32a is rotated, in response to the insertion of the tape cassette into cassette holder 12. First mode-switching cam 32a actuates switch lever 31 in such a manner that vertically-movable gear 30 is brought into mesh with driving gear 29. After first mode-switching cam 32a is rotated by a first predetermined angle, loading motor 32 is stopped, with the mesh between vertically-movable gear 30 and driving gear 29 maintained. Simultaneous with this, capstan motor 27 is driven, and the driving force of this motor is transmitted to front loading mechanism 13 through driving gear 29, vertically-movable gear 30, pulley 33, driving belt 34, pulley 35, and worm 36, as mentioned above. Thus, the tape cassette is mounted on reel bases 14 and 15.

After the cassette loading is completed in the above manner, loading motor 32 is driven again, and first mode-switching cam 32a is rotated by a second predetermined angle. In accordance with this rotation, switch lever 31 is swung in the reverse direction E, causing vertically-movable gear 30 to separate from driving gear 29. Simultaneous with this, second mode-switching cam 32e coaxial with first mode-switching cam 32a is also rotated by the second predetermined angle, whereby first and second tape-pulling members 39a and 39b are driven to perform tape loading.

Thereafter, first and second mode-switching cams 32a and 32e, and other mode-switching cams (not shown) which are coaxial with first and second mode-switching cams 32a and 32e are rotated by the angle corresponding to a desirable operating mode. In accordance with this rotation of the cams, an operating mode-switching mechanism (not shown) is driven such that the tape-driving mechanism is selectively switched into one of the operating modes, such as the play mode, fast-forward mode, fast-rewind mode, etc.

As mentioned above, vertically-movable gear 30 is moved in the axial direction thereof, with reference to driving gear 29 driven by capstan motor 27, and the movement of gear 30 is controlled by switch lever 31 which is moved in association with the driving of first mode-switching cam 32a. In this manner, the driving force of driving gear 29 is selectively transmitted to front loading mechanism 13 through vertically-movable gear 30. Thus, the cassette-loading operation can be controlled with high accuracy by utilization of the driving force of capstan motor 27. Since the number of structural components of the VTR can be reduced while maintaining the highly-accurate operation of the front loading mechanism, the size and weight of the VTR can be reduced to the possible degree.

A description will now be given of the construction featuring the present invention. As was described above with reference to FIG. 4, the rotation transmission mechanism of the embodiment of the present invention comprises: first clutch gear 19 (which serves as a driven gear), friction mechanism 20, second clutch gear 21 (which serves as a driving gear), directly-coupling gear 22, change-over lever 23a, pulley 24, and driving belt 25. Second clutch gear 21 is coaxially stacked upon first clutch gear 19 in such a manner that friction mechanism 20 made up of friction coupling 20a, clutch plate 20b and friction coupling 20c is interposed. Friction couplings 20a and 20c have frictional forces corresponding to desired torques. For example, the frictional force of friction coupling 20a is smaller than that of friction coupling 20c. Coupling member 20d is coupled to clutch plate 20b such that it is rotatable by the same angle as clutch plate 20b. The rotating direction of coupling member 20d is restricted by coil spring 20e to only one direction (e.g., the clockwise direction as viewed in FIG. 4). In this way, coupling member 20d and coil spring 20e jointly constitute a one-way clutch.

When second clutch gear 21 (i.e., the driving gear) is rotated in the clockwise direction, as viewed in FIG. 4, first clutch gear 19 (i.e., the driven gear) slides over friction coupling 20a (which has a small frictional force), but does not slide over friction coupling 20c or clutch plate 20b, due to the action of coil spring 20e. Therefore, first clutch gear 19 is rotated with the first torque corresponding to the frictional force of friction coupling 20a. Accordingly, first clutch gear 19 controls the driving of both gear 18 and reel base-driving gear 16 of the reel base-driving device with the first torque, thereby driving the tape in the manner predetermined for the play mode of the VTR.

When second clutch gear 21 is rotated in the counter-clockwise direction, as viewed in FIG. 4, first clutch gear 19 slides over both friction coupling 20c and second gear 21. At this time, first clutch gear 19 does not slide over friction coupling 20a (which has a small frictional force) or clutch plate 20b, due to the action of coil spring 20e. Therefore, first clutch gear 19 is rotated with the second torque corresponding to the frictional force of friction coupling 20c. Accordingly, second clutch gear 21 controls the driving of gear 18 and reel base-driving gear 16 with the second torque, whereby take-up reel base 14 is rotated, permitting the tape to be driven in the manner predetermined for the rewind play mode of the VTR.

Figure 9:
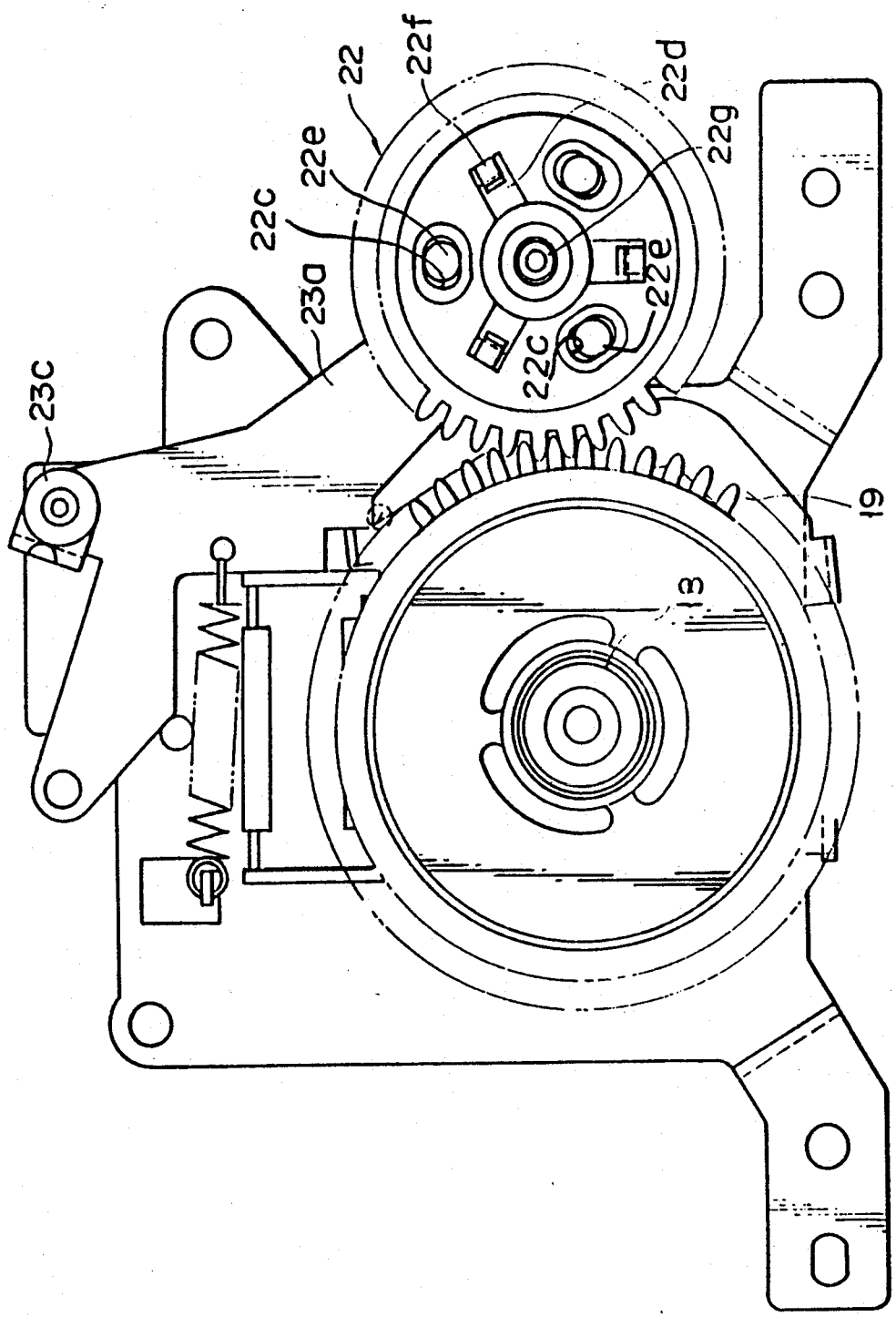
FIG. 9 is a bottom view of the rotation transmission mechanism shown in FIG. 4.

Directly-coupling gear 22 is arranged such that it can be engaged or disengaged from first and second clutch gears 19 and 21. This directly-coupling gear 22 includes first and second gears 22a and 22b, and these gears 22a and 22b are stacked upon each other in such a manner as to provide gaps mentioned below. As is shown in FIG. 9, first gear 22a has a plurality of engagement holes 22c and a plurality of stopper sections 22d, while second gear 22b has a plurality of engagement portions 22e and a plurality of stopper pieces 22f. Engagement portions 22e are inserted in respective engagement holes 22c, with gaps having a predetermined size provided in the circumferential direction. Likewise, stopper pieces 22f are inserted in respective stopper sections 22d, with gaps having a predetermined size provided in the circumferential direction. That is, first and second gears 22a and 22b are integrally combined with each other in such a manner as to provide the above-mentioned gaps. Engagement holes 22c, stopper sections 22d, engagement portions 22e and stopper pieces 22f are arranged in the circumferential direction of the gears at a predetermined pitch. In order to provide the above-mentioned gaps, the first width of each engagement hole 22c (the first width being the width viewed in the circumferential direction) is slightly greater than the second width of the corresponding engagement portion 22e (the second width being the width viewed in the circumferential direction). Likewise, the third width of each stopper section 22d (the third width being the width viewed in the circumferential direction) is slightly greater than the fourth width of the corresponding stopper piece 22f (the fourth width being the width viewed in the circumferential direction).

Figure 10:
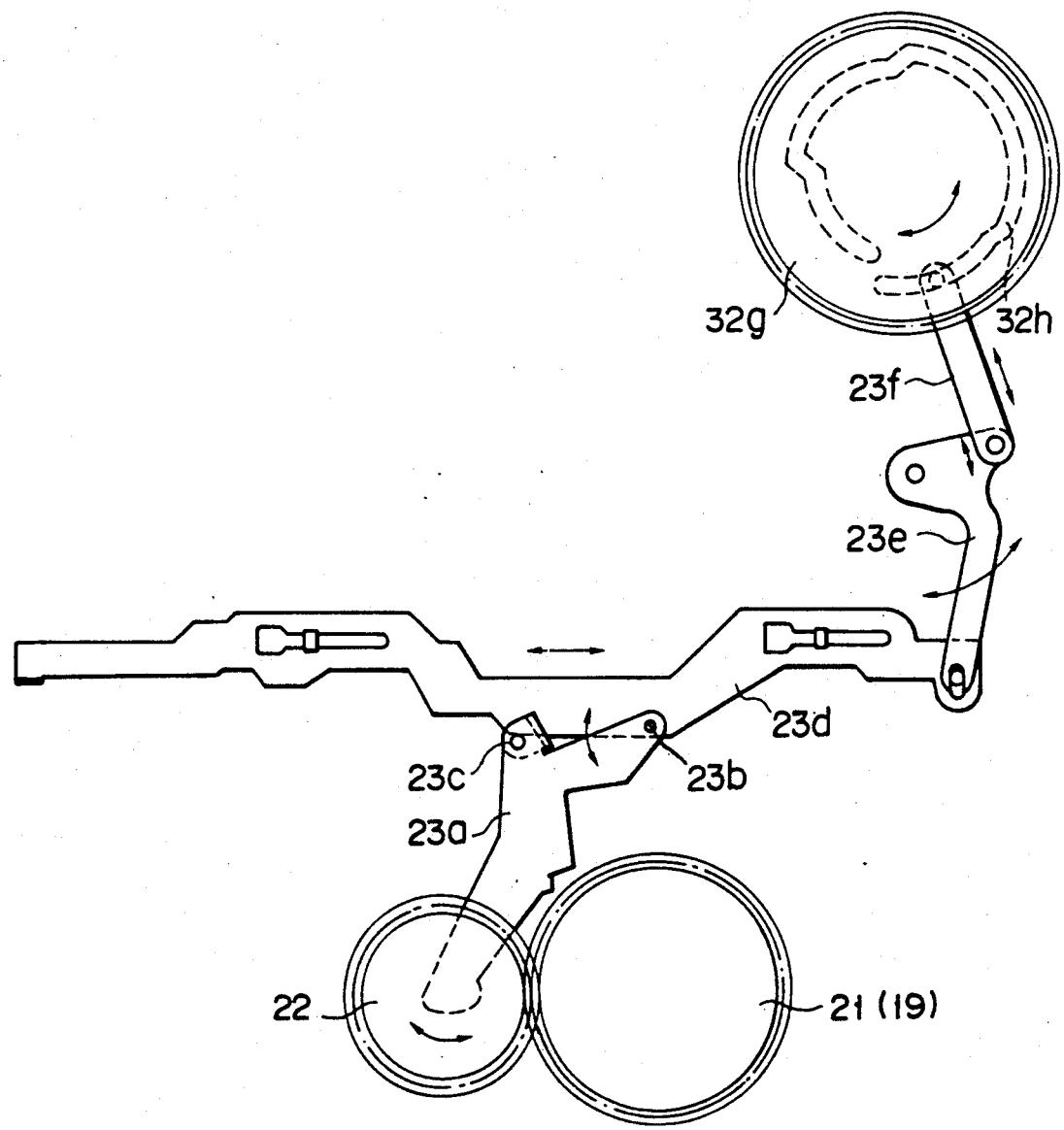
FIG. 10 is a top view illustrating the construction of engagement-switching means.

Directly-coupling gear 22 is driven by use of an engagement-switching means, such as that shown in FIG. 10. Referring to FIG. 10, shaft 22g (shown in FIG. 9) around which directly-coupling gear 22 swings is embedded into change-over lever 23a. When slider 23d moves rightward or leftward, as viewed in FIG. 10, abutting member 23c is pushed in accordance with the movement of slider 23d. Since, therefore, change-over lever 23a is urged or swung with shaft 23b as a center, first and second gears 22a and 22b of directly-coupling gear 22 are selectively brought into engagement with first and second clutch gears 19 and 21. One end of slider 23d is connected to cam groove 32h of third mode-switching cam 32g, through both slider lever 23e and slider-driving lever 23f. Third mode-switching cam 32g is coaxial with both first and second mode-switching cams 32a and 32e, and loading motor 32 rotates these mode-switching cams by the same angle in accordance with an operating mode.

When the VTR is set in a mode in which the tape should be driven fast, as in the fast forward mode or the fast rewind mode, loading motor 32 is driven in accordance with the operating mode under the control of controller 50 and motor driver 49. As a result, third mode-switching cam 32g is rotated, thereby moving slider 23d. In accordance with the movement of slider 23d, change-over lever 23a swings, and first and second gears 22a and 22b of directly-coupling gear 22 are selectively brought into engagement with first and second clutch gears 19 and 21. Therefore, first and second clutch gears 19 and 21 receive a driving force and are rotated equally with the third torque In accordance with the rotating direction of first and second clutch gears 19 and 21, one of gears 14a and 15a of reel bases 14 and 15 is rotated fast, on the basis of the torque transmitted through gear 18, swing member 17 and reel base-driving gear 16.

As mentioned above, directly-coupling gear 22 of the rotation transmission mechanism of the embodiment is made up of first and second gears 22a and 22b which are coaxial with each other and which provide gaps in the circumferential direction. By use of this directly-coupling gear 22, driving and driven gears 21 and 19, which are coaxially arranged with friction mechanism 20 interposed, are coupled directly to each other. With this construction, torsion between driving and driven gears 21 and 19 is absorbed by the gaps which first and second gears 22a and 22b provide in the circumferential direction. Since, therefore, the teeth of the directly-coupling gear are not twisted, as in the prior art, noise during the gear engagement is prevented. In addition, since the force acting to urge the directly-coupling gear in a direction away from the driving and driven gears is reduced, the driving of the directly-coupling gear can be controlled with the highest possible accuracy, thus contributing to the stable feed of the tape.

The above embodiment was described, referring to the case where the invention was applied to a VTR. However, the present invention is not limited to this embodiment, and may be applied to any type of VTR, such as a cassette tape recorder. That is, the present invention is not limited to a particular embodiment, and can be modified in various manners without departing from the spirit and scope thereof.

Additional advantages and modifications will readily occur to those skilled in the art. Therefore, the invention in its broader aspects is not limited to the specific details, representative device, and illustrated example shown and described. Accordingly, departures may be made from such details without departing from the spirit or scope of the general inventive concept as defined by the appended claims and their equivalents.

What is claimed is:

1. A rotation transmission mechanism, comprising:
a first driving gear to which a driving force is transmitted from a driving source;
a second driving gear, arranged coaxial with the first driving gear with a friction mechanism interposed, for receiving the driving force transmitted from the first driving gear through the friction mechanism and for outputting the driving force;
first and second directly-coupling gears engageable with the first and second driving gears and arranged coaxial with each other in such a manner as to provide gaps of a predetermined size in a circumferential direction thereof, said gaps serving to absorb torsion generated between the first and second driving gears, said first and second directly-coupling gears transmitting the driving force from the first driving gear directly to the second driving gear when the first directly-coupling gear is engaged with the first driving gears and the second directly-coupling gear is engaged with the second driving gear; and
engagement-switching means for selectively moving the first and second directly-coupling gears between a first position at which the first and second directly-coupling gears are engaged with the first and second driving gears and a second position at which the first and second directly-coupling gears are disengaged from the first and second driving means.

2. The rotation transmission mechanism according to claim 1, wherein said first directly-coupling gear has a plurality of engagement holes which are formed at a predetermined pitch in the circumferential direction and each of which has a predetermined first width.

3. The rotation transmission mechanism according to claim 2, wherein said second directly-coupling gear has a plurality of engagement portions which are formed at the predetermined pitch in the circumferential direction and each of which has a predetermined second width smaller than the first width, said engagement portions being inserted in the engagement holes to provide the gaps.

4. The rotation transmission mechanism according to claim 3, wherein said first directly-coupling gear further has a plurality of stopper sections which are formed at the predetermined pitch in the circumferential direction and each of which has a predetermined third width.

5. The rotation transmission mechanism according to claim 4, wherein said second directly-coupling gear formed at the predetermined pitch in the circumferential width, said stopper pieces being inserted and engaged with the stopper sections to provide the gaps.

* * * * *

UNITED STATES PATENT AND TRADEMARK OFFICE
CERTIFICATE OF CORRECTION

PATENT NO. : 5,109,723
DATED : May 5, 1992
INVENTOR(S) : Kato

It is certified that error appears in the above-indentified patent and that said Letters Patent is hereby corrected as shown below:

Column 10, line 58, after "gear" insert --further has a plurality of stopper Pieces which are--; and Column 10, line 60, before "width" insert --direction and each of which has a predetermined fourth width smaller than the third--.

Signed and Sealed this

Twenty-eighth Day of June, 1994

Attest:

BRUCE LEHMAN

*Attesting Officer*  Commissioner of Patents and Trademarks

UNITED STATES PATENT AND TRADEMARK OFFICE
CERTIFICATE OF CORRECTION

PATENT NO. : 5,109,723
DATED : May 5, 1992
INVENTOR(S) : Kato

It is certified that error appears in the above-indentified patent and that said Letters Patent is hereby corrected as shown below:

Column 10, line 58, after "gear" insert —further has a plurality of stopper pieces which are—; and Column 10, line 60, before "width" insert —direction and each of which has a predetermined fourth width smaller than the third—.

This certificate supersedes Certificate of Correction issued June 28, 1994.

Signed and Sealed this

Thirteenth Day of September, 1994

Attest:

BRUCE LEHMAN

Attesting Officer

Commissioner of Patents and Trademarks